United States Patent
Sumner et al.

(10) Patent No.: US 9,994,300 B2
(45) Date of Patent: Jun. 12, 2018

(54) STRAPPED WINDSHIELD ASSEMBLY FOR ROTORCRAFT

(71) Applicant: Bell Helicopter Textron Inc., Fort Worth, TX (US)

(72) Inventors: William Sumner, Kingsport, TN (US); Tim Reed, Bluff City, TN (US); Christopher Marvin Rowe, Bristol, TN (US); Lawrence Duane Lee, Piney Flats, TN (US); Glen Rivers, Johnson City, TN (US); Robert Harmon, Piney Flats, TN (US); Jeremy Robert Schadler, North Richland Hills, TX (US); William Lewis Neal, II, Abingdon, VA (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 10 days.

(21) Appl. No.: 15/410,993

(22) Filed: Jan. 20, 2017

(65) Prior Publication Data
US 2017/0129587 A1  May 11, 2017

Related U.S. Application Data

(63) Continuation of application No. 14/187,822, filed on Feb. 24, 2014, now Pat. No. 9,550,580.

(51) Int. Cl.
  *B64D 45/00* (2006.01)
  *B64C 1/14* (2006.01)
(52) U.S. Cl.
  CPC ............ *B64C 1/1492* (2013.01); *B64D 45/00* (2013.01)
(58) Field of Classification Search
  CPC .............................. B64D 45/00; B64C 1/1492
  See application file for complete search history.

(56) References Cited

U.S. PATENT DOCUMENTS

| 2,088,884 A | 8/1937 | Ulrich et al. |
| 4,611,850 A | 9/1986 | Fujikawa |

(Continued)

FOREIGN PATENT DOCUMENTS

| AT | 383317 B | 6/1987 |
| EP | 2570342 A1 | 3/2013 |

(Continued)

OTHER PUBLICATIONS

European Patent Office, Communication Pursuant to Article 94(3) EPC dated Sep. 24, 2014 in European Appl. No. 14167502.5—5 pp.

(Continued)

*Primary Examiner* — Philip J Bonzell
*Assistant Examiner* — Michael B Kreiner
(74) *Attorney, Agent, or Firm* — Daniel J. Chalker; Edwin S. Flores; Chalker Flores, LLP

(57) ABSTRACT

This description relates to a strapped windshield assembly for a rotorcraft. In some implementations, the rotorcraft includes an airframe, a windshield, and a plurality of independent straps connected to the airframe and the windshield, the straps operative to move independently with respect to one another. The independent movement of the straps allow relative movement of portions of the windshield in response to a strike. In some implementations, the straps are spaced every 4-6 inches along an edge of the windshield. In some implementations, the straps are over an edge of the windshield. The straps can have a modulus of elasticity of 8-12 millions of pounds per square inch (MSI). The windshield can include polycarbonate material.

19 Claims, 5 Drawing Sheets

(56) References Cited

U.S. PATENT DOCUMENTS

| | | | |
|---|---|---|---|
| 4,699,335 | A | 10/1987 | Deoms et al. |
| D304,438 | S | 11/1989 | Waldrup |
| 7,942,369 | B2 * | 5/2011 | Mahieu ................. B64C 1/1476 244/119 |
| 8,616,507 | B2 | 12/2013 | Willey |
| 9,550,580 | B2 | 1/2017 | Sumner et al. |
| 2008/0099614 | A1 * | 5/2008 | Blue .................... B64C 1/1492 244/129.3 |

FOREIGN PATENT DOCUMENTS

| | | |
|---|---|---|
| EP | 2910464 A1 | 8/2015 |
| FR | 2939104 | 6/2010 |

OTHER PUBLICATIONS

European Patent Office, Communication Pursuant to Article 94(3) EPC dated Nov. 5, 2015 in European Appl. No. 14167502.5—6 pp.

European Patent Office, European Search Report dated Sep. 10, 2014 in European Appl. No. 14167502.5—3 pp.

Kay, Bruce F. "Helicopter Transparent Enclosures: vol. I—Design Handbook" Jan. 1979.

United States Air Force, "Military Specification: Plastic Sheet, Polycarbone, Transparent" MIL-P-83310 (USAF) Jan. 27, 1971, Author Unknown.

U.S. Department of Commerce, Technology Assessment, Department of the Air Force; "New Windshield to Improve Birdstrike Protection", 2301 NTIS Tech Notes, Springfield, VA, U.S., Jun. 1, 1989—p. 481.

Canadian Intellectual Property Office, Examination Report for Appl. No. 2,882,785 dated Dec. 21, 2016, 4 pp.

* cited by examiner

STRAPPED WINDSHIELD ASSEMBLY FOR ROTORCRAFT

CROSS-REFERENCE TO RELATED APPLICATIONS

This application claims priority to and is a continuation patent application of U.S. patent application Ser. No. 14/187,822 filed on Feb. 24, 2014, now U.S. Pat. No. 9,550,580, which is hereby incorporated by reference in its entirety.

STATEMENT REGARDING FEDERALLY SPONSORED RESEARCH OR DEVELOPMENT

Not applicable.

BACKGROUND

The following description relates to a windshield assembly for a rotorcraft.

Rotorcraft include helicopters, tilt wing aircraft, and other vertical lift aircraft that have rotary-wings. Typically, several rotor blades are mounted on a single mast to form a rotor. The rotor blades provide lift to the aircraft.

A helicopter is a rotorcraft whose rotors are driven by the engine throughout flight to allow the helicopter to take off and land vertically and to hover, fly forwards, backwards and laterally. During flight, strike events can pose significant hazards for helicopters. A bird or other object can impact the windshield with sufficient force to damage or penetrate the windshield.

DESCRIPTION OF DRAWINGS

Like reference symbols in the various drawings indicate like elements.

SUMMARY

Figure 1:
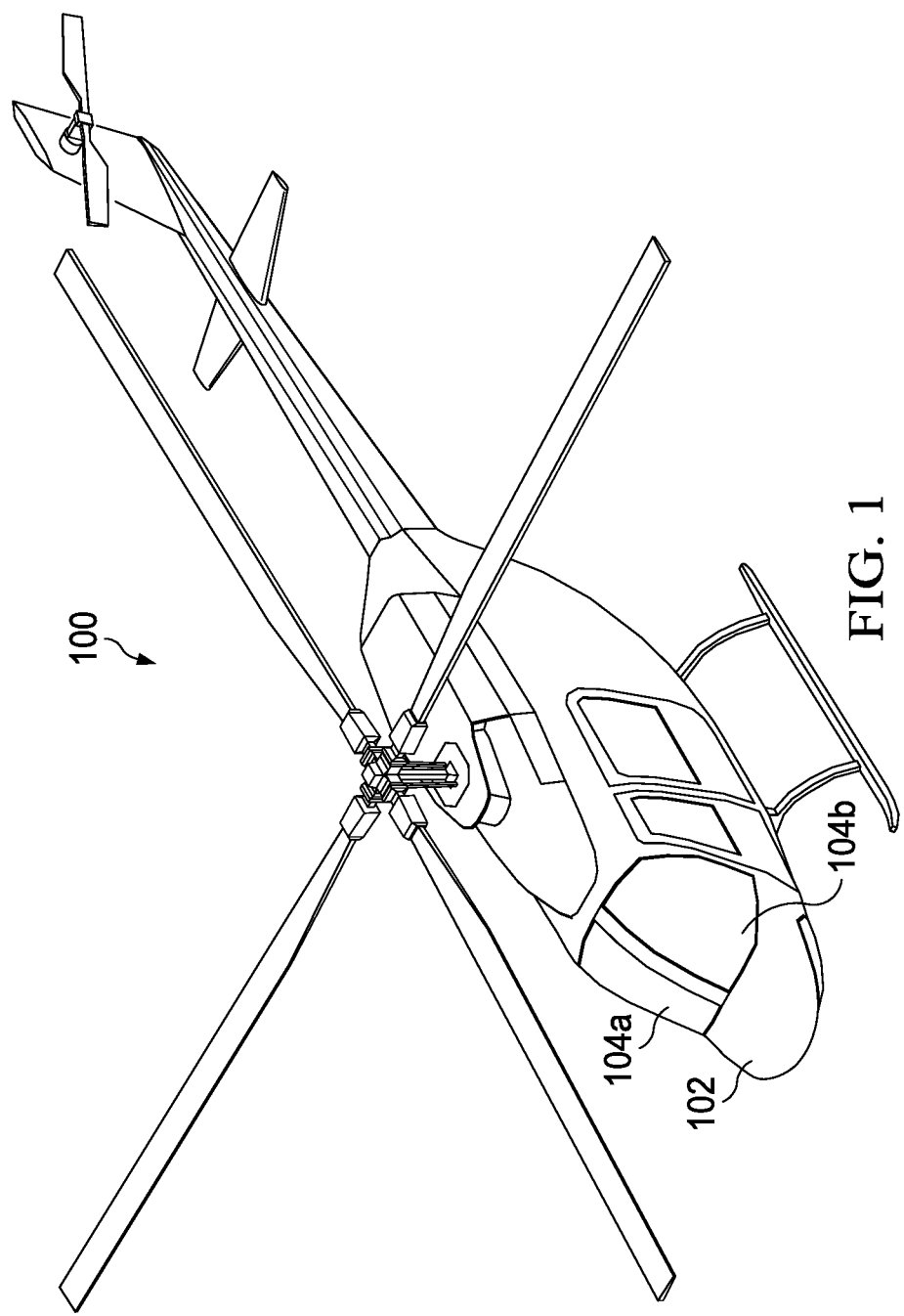
FIG. 1 is an example helicopter.

This description relates to a strapped windshield assembly for a rotorcraft. In some implementations, the rotorcraft includes an airframe, a windshield, and a plurality of independent straps connected to the airframe and the windshield, the straps operative to move independently with respect to one another. The independent movement of the straps allow relative movement of portions of the windshield in response to a strike. In some implementations, the straps are spaced every 4-6 inches along an edge of the windshield. The straps may extend over the edge of the windshield. The straps can include at least one of metal and composite material. In some implementations, each strap is coupled to the windshield by a connector comprising a grommet extending through the windshield and a fastener extending through the grommet. The connector is operative to allow movement of the windshield relative to the strap. The straps can have a modulus of elasticity of 8-12 millions of pounds per square inch (MSI). The windshield can include polycarbonate material.

This and other implementations can include one or more of the following features. One or more airframe corner supports can be mounted to the airframe at an outside corner of the windshield, the airframe corner supports operative to independently support an upper portion of the windshield in response to a strike. The airframe corner support can include multiple layers of material. The airframe corner support can have a modulus of elasticity of 8-12 millions of pounds per square inch (MSI). The airframe corner support can be secured to the airframe independent of the windshield. The airframe corner support can be under the windshield. The airframe corner supports and its features may be implemented alone or in combination with the independent straps and other implementations.

In some implementations, windshield edging secures the windshield to the airframe. In some implementations includes strapped edging including a plurality of straps connected to the windshield. The windshield edging can include at least one of metal and a composite material. The windshield edging and its features may be implemented alone or in combination with the independent straps, corner supports and other implementations.

In some implementations, a windshield assembly for a rotorcraft includes a windshield, strapped edging mounted around a periphery of the windshield, the strapped edging including a plurality of edging straps connected to the windshield, and a plurality of secondary support straps mounted around the periphery of the windshield, the straps and secondary straps operative to move independently with respect to each other. The straps can be at least one of metal and composite material. The straps can be spaced every 4-6 inches around the periphery of the windshield. The secondary straps can be at least one of metal and composite material and spaced every 2-3 inches around a majority of the periphery of the windshield. In some implementations, each secondary strap mirrors a corresponding strap of the strapped edging, each secondary strap and corresponding strap connected to the windshield by a connector including a grommet extending through the windshield and a fastener extending through the grommet, the secondary strap and the corresponding strap allowing movement of the windshield relative to the strap and the secondary strap.

DETAILED DESCRIPTION

FIG. 1 is a diagram of an example rotorcraft 100. In this example, the rotorcraft 100 is a helicopter. The rotorcraft may be other types of rotary-wing aircraft such as tilt wing aircraft or other vertical lift aircraft. The helicopter 100 includes an airframe 102 that forms the mechanical structure of the helicopter 100. The aircraft may comprise other suitable types of winged craft. The helicopter 100 includes windshields 104a, 104b. The windshields 104a, 104b may be any suitable cover or windscreen that protects the pilots while allowing visibility to fly the aircraft 100.

The airframe 102 surrounds and supports the windshields 104a, 104b. The windshields 104a, 104b can be a material such as polycarbonate, or another suitable material or combination of materials. The windshields 104a, 104b may comprise hard coat. The windshields 104a, 104b may be directly or indirectly mounted to the airframe 102. For example, the windshields 104a, 104b may each be mounted to an edging that is mounted to the airframe 102. In some implementations, the windshield 104a, 104b includes approximately 0.12 to 0.25 inch thick polycarbonate material that is attached to the airframe 102 via through holes around the perimeter of the windshield 104a, 104b. The polycarbonate material could be retrofit onto existing aircraft or implemented on newly assembled aircraft.

In operation, the aircraft 100 may suffer a bird or other strike to a windshields 104a, 104b. In accordance with an aspect of the disclosure, the windshields 104a, 104b are impact resistant to improve the likelihood of deflecting the bird or other striking object from entering the cockpit and injuring the pilot. For example, the windshields 104a, 104b may be mounted to the airframe 102 to allow the windshields 104a, 104b to undergo significant deformation from the force of the strike impact while supporting the windshields 104a, 104b to improve the likelihood of deflecting the object. Thus an object striking a windshield 104a, 104b is deflected, for example by rolling or sliding toward the upper edge of the windshield 104a, 104b after impact.

Figure 2:
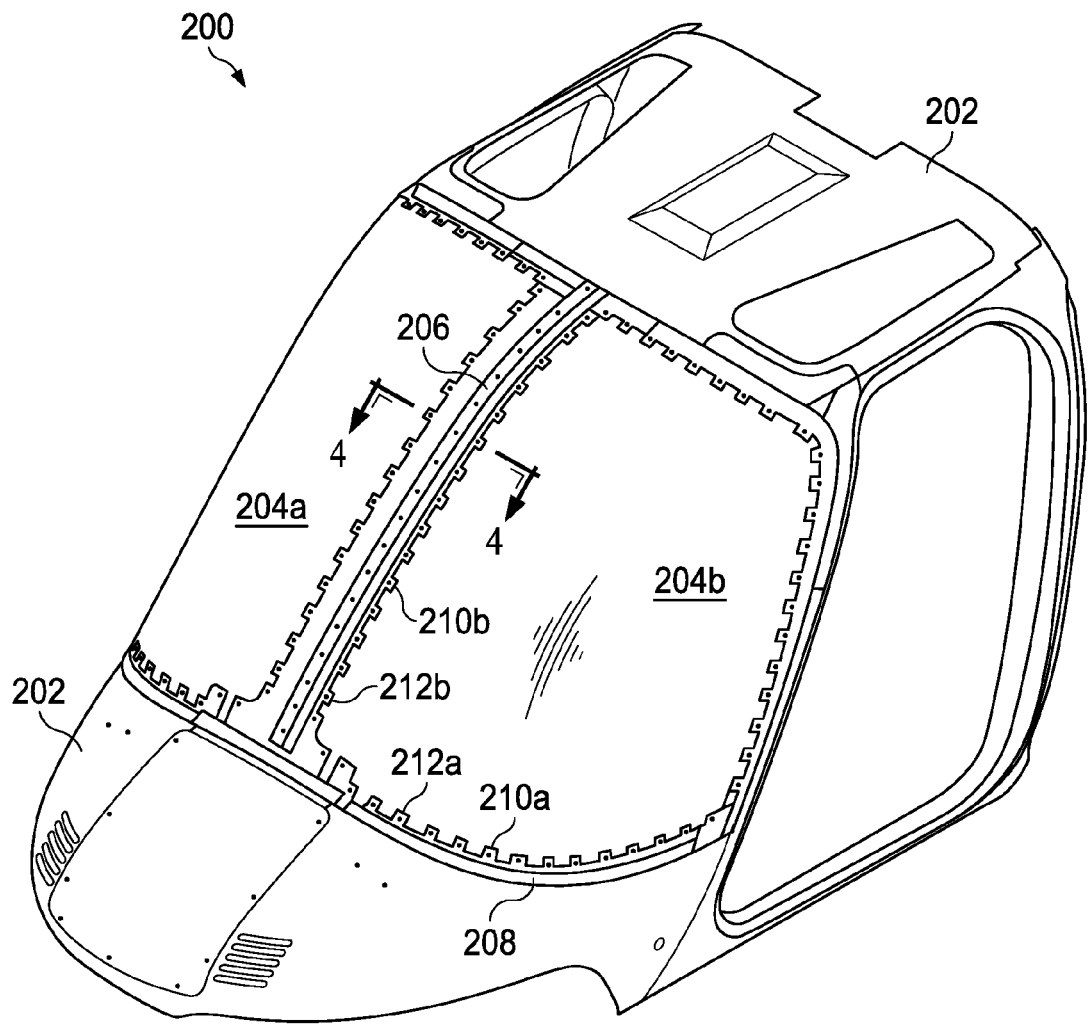
FIG. 2 is an example cockpit of a helicopter with a strapped windshield assembly.

FIG. 2 shows an example cockpit for a rotorcraft such as a helicopter 200. The cockpit includes airframe 202 and windshields 204a, 204b. The airframe 202 includes a centerpost 206. The windshields 204a, 204b are connected to and surrounded by airframe 202 around the outer, or periphery, edges of the windshields 204a, 204b.

The windshields 204a, 204b are connected to the airframe by a series of individual straps positioned around the edges of the windshield 204a, 204b. Example individual straps 210a, 210b are indicated in FIG. 2. The straps 210a, 210b can be connected to the airframe directly or indirectly, such as via windshield edging 208. The straps 210a, 210b may extend from the airframe 202 or mounting hardware over the edge of the windshield 204a, 204b.

The straps may be roughly evenly spaced around the edges of each windshield 204a, 204b, for example the straps can be spaced roughly every 4-6 inches. Thus, the straps may be spaced, for example, spaced every 4-6 inches over the entire of the windshield edge, or majority of the edge or the entire edge except the corner portions. In some implementations the straps may have a different spacing, different width, an irregular spacing, or a different number of straps. The straps, for example, could be spaced every 2-3 inches or 6-8 inches. Furthermore, the straps shown in FIG. 2 have a generally rectangular shape, but in other implementations the straps can have another shape, such as a triangular shape or an irregular shape. In other implementations, straps can have different shapes. In some implementations, the straps have one or more holes for securing to the windshield, airframe, or other aircraft components.

The plurality of independent straps 210a, 210b are connected to the airframe and the windshield. The straps 210a, 210b are individually and independently able to flex and otherwise move with respect to the windshields 204a, 204b and the airframe. The straps 210a, 210b are operative to move independently with respect to each other and could be connected directly or indirectly to each other. During a strike, the flexing straps 210a, 210b are able to support the windshield 204b as the windshield deforms and flexes. The straps 210a, 210b may comprise support straps and may hold the windshield 204b to allow flexing of the windshield 204b after impact. For example, the portion of windshield 204b surrounding strap 210a may be deformed a different amount or at a different time than the portion of windshield 204 surrounding strap 210b. The independent movement of the straps 210a, 210b allow relative movement of portions of the windshield 204b in response to a strike. Each strap 210a, 210b can flex independently even if multiple straps are connected. The independent movement and flexation of the straps 210a, 210b can reduce windshield stress and shear near the airframe during a strike. Thus, the straps can reduce or prevent windshield cracking, breaking, airframe damage, or separation of the windshield from the airframe.

The windshields edging 208 may be used to mount windshields 204a, 204b to the airframe 202. The windshield edging is one or more components surrounding the windshield 204a, 204b that is coupled to the airframe 202. The windshield edging 208 can be made of metal, acrylic, composite, or other materials or combinations of materials. In some instances one or more seals are included between the airframe 202, windshield edging 208, and or the windshield 204a, 204b. One or more seals or silicon rubber or other material may be used between the windshield edging 208 and the airframe 202. In other embodiments the edging may be omitted and the windshield 204a, 204b directly connected to the airframe 202.

The edging 208 may comprise strapped edging including a series of secondary straps. Example secondary straps 212a, 212b are indicated in FIG. 2. The secondary straps 212a, 212b may comprise edging straps and may be roughly evenly spaced around the edges of each windshield 204a, 204b, for example the straps can be spaced roughly every 2-3 inches. Thus, the secondary straps may be spaced, for example, spaced every 2-3 inches over the entire of the windshield edge, or majority of the edge, or the entire edge except the corner portions. In some implementations the secondary straps may have a different spacing, an irregular spacing, or a different number of straps. Thus, the straps could be spaced every 1-2 inches or 3-4 inches. Together, the straps and secondary straps may form a reinforced strapped or sawtooth edging. The independent straps 210a, 210b may be used alone and/or without the secondary straps 212a, 212b and edging 208. In this implementation, the independent straps 210a, 210b may be made of metal such as, for example, Aluminum.

Figure 3:
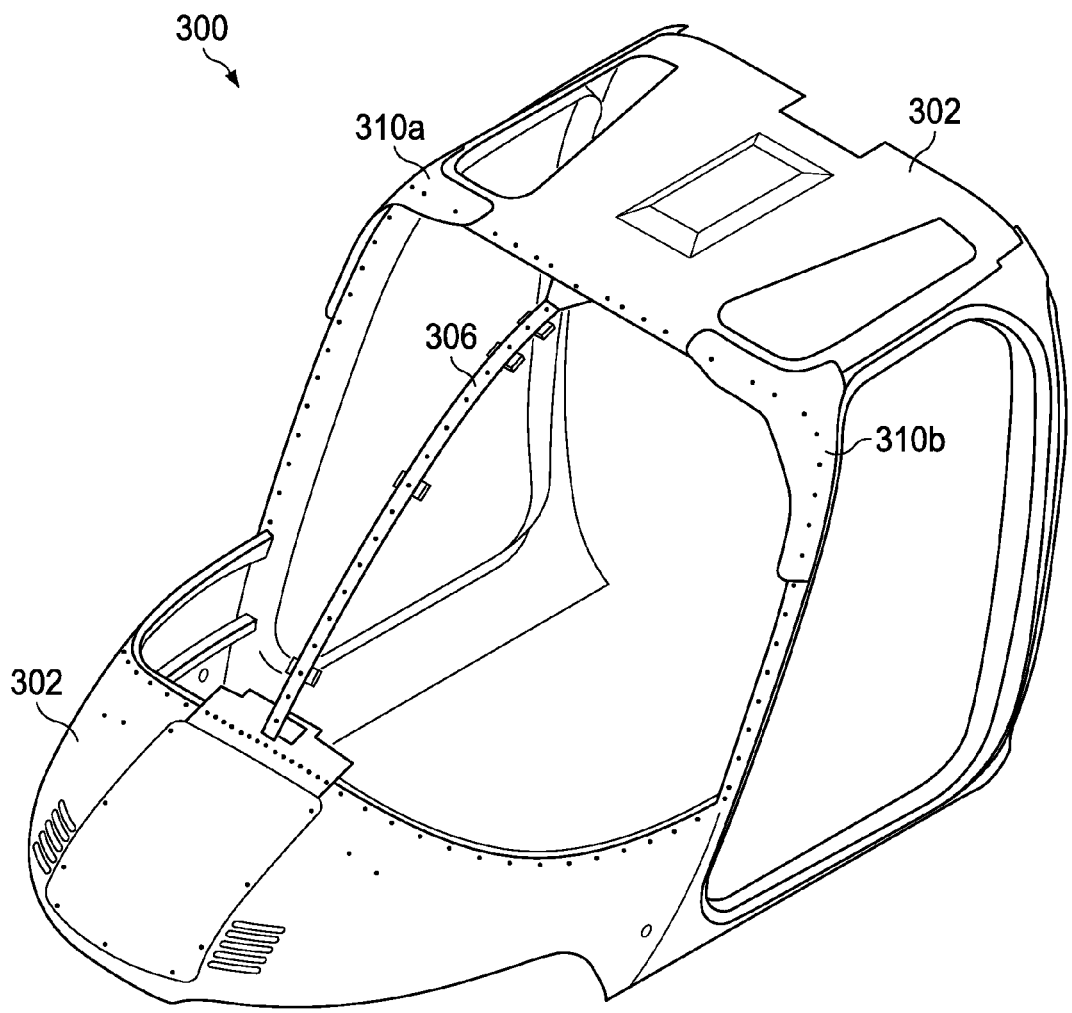
FIG. 3 is an example airframe of a helicopter cockpit

FIG. 3 shows an example airframe 302 of a rotorcraft such as a helicopter 300. The example airframe 302 is substantially similar to the airframes 102 and 202 respectively shown in FIG. 1 and FIG. 2. The airframe 302 includes a centerpost 306 and example corner supports 310a, 310b. The example corner supports 310a, 310b extend from the airframe 302 beneath a corner portion of the windshields (not shown). During some strike events, the striking object is deflected toward an upper outside portion of a windshield, and that upper portion of the windshield can experience damaging stress. The corner supports 310a, 310b provide additional support to the upper outside portion of the windshields during the strike. The airframe corner supports 310a, 310b are mounted to the airframe 302 at, or across, an outside corner of the windshield. The airframe corner supports 310a, 310b are operative to independently support an upper portion of the windshield in response to a strike.

The corner supports 310a, 310b can be made of a flexible material such as aluminum or another metal, for example a material with a modulus of elasticity from 8-12 millions of pounds per square inch (MSI). As such, the corner supports 310a, 310b are able to flex during deformation of windshields during a strike and reduce windshield stress at the upper outside portion of the windshields. The corner supports may work together with the independent straps and/or other parts of the strapped edging to support the windshield during such deformation. Corner supports 310a, 310b may comprise other materials such as composite materials.

In some implementations, the corner supports 310a, 310b are secured to the airframe 302 independent of the windshield. The corner supports 310a, 310b may not be directly attached to the windshields, and may be able to flex and move independently of the windshields and allow independent movement of the windshield. To facilitate independent movement between the corner supports and the windshield, the corner supports 310a, 310b can have clearance holes (not shown) extending partially or completely through. For example, the clearance holes can be located at windshield fasteners so that the fasteners do not contact the corner supports 310a, 310b. The corner supports 310a, 310b can also be located under the windshield.

The corner supports 310a, 310b can have a shape such as that shown in FIG. 3 or a different shape. For example, the corner supports 310a, 310b can extend from the airframe 302 more than shown or less than shown. As another example, the corner supports 310a, 310b can have a different shape to conform to a different type of airframe. For example, the corner supports 310a, 310b may generally cut across, round or provide a support that extends forward of the outside corner. The corner supports 310a, 310b may be implemented alone or in combination with the straps 210a, 210b and secondary straps 212a, 212b.

Each corner support 310a, 310b can be a single piece or include multiple pieces. In some implementations, some or all of the corner supports 310a, 310b have multiple layers. For example, the corner supports 310a, 310b may have two, three or more layers. The multiple layers can be the same or different materials. In some examples, multiple layers of the corner support 310a, 310b allow the relative movement of the layers. The corner supports 310a, 310b can have a layer thickness such as 0.02 inches thick.

Figure 4:
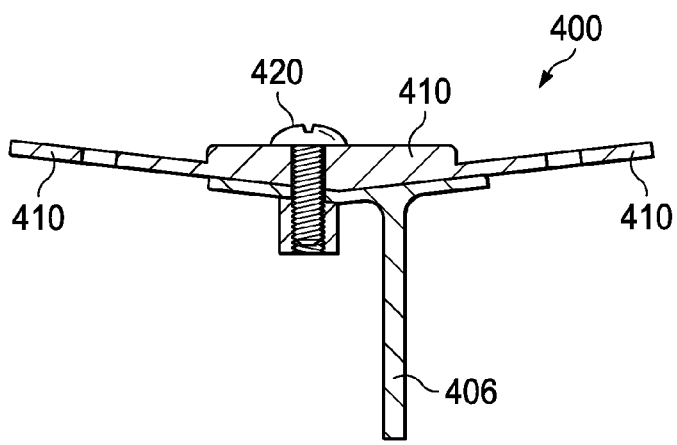
FIG. 4 shows a cross-section of a centerpost assembly of a helicopter airframe.

FIG. 4 shows a cross-section of an example centerpost assembly 400. An example location of the cross-section of the centerpost assembly 400 is indicated in FIG. 3. The centerpost assembly 400 includes a centerpost 406 and an example centerpost doubler 410. The centerpost doubler 410 is secured to the centerpost by fastener 420, although other securing techniques can be used. The centerpost doubler 410 is a member that extends from the centerpost 406 and provides a mounting surface for the one or more windshields either directly or via edging. The centerpost doubler 410 can include multiple holes for fasteners or other features for securing the windshields. The centerpost doubler 410 can be the same material as the centerpost 406 or a different material such as metal or composite.

Figure 5:
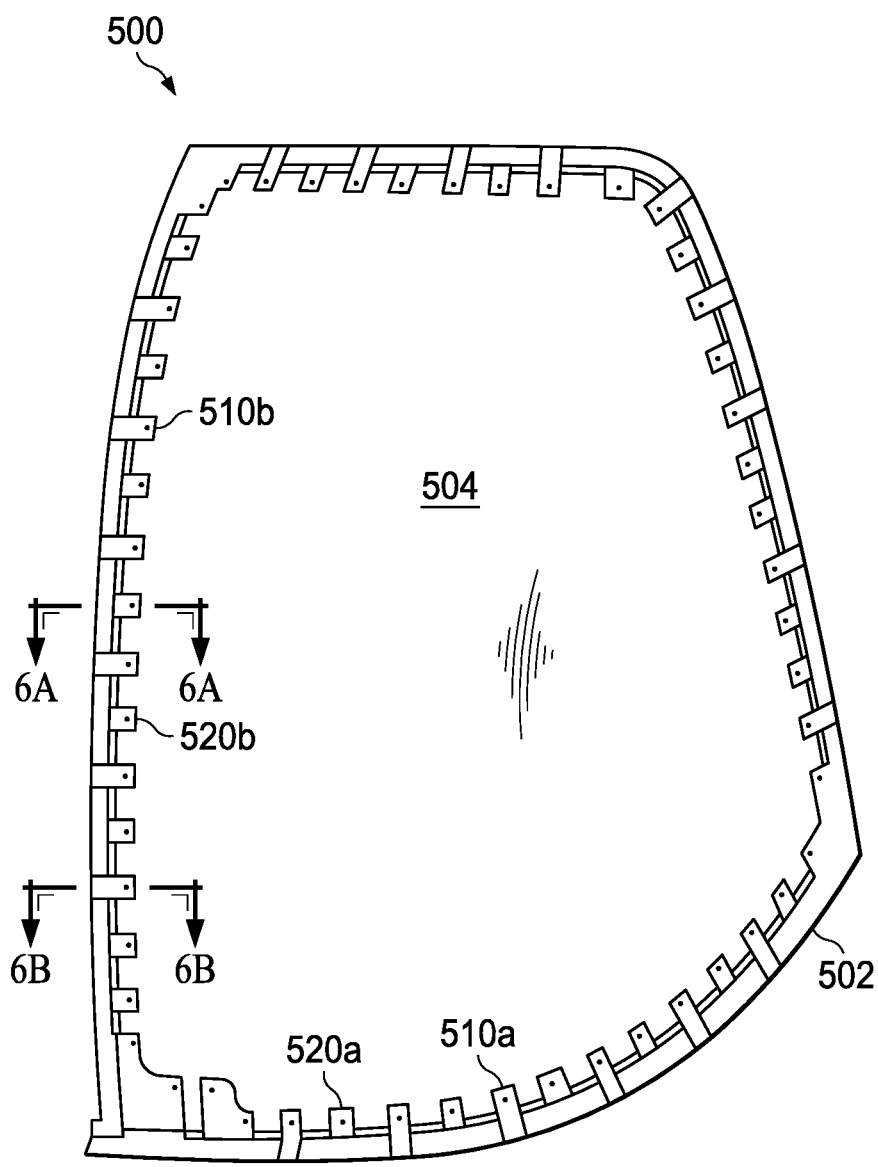
FIG. 5 is an example windshield assembly of a helicopter.

FIG. 5 shows an example windshield assembly 500, viewed in the outboard direction from the inboard side of the cockpit. The example windshield assembly 500 is substantially similar to a windshield assembly such as that surrounding windshield 204a in FIG. 2. The windshield assembly 500 includes a windshield 504, a plurality of straps mounted around the periphery of the windshield 504, and an airframe 502 with a plurality of secondary straps. Example straps 510a, 510b and example secondary straps 520a, 520b are indicated in FIG. 5. The straps 510a, 510b are straps substantially similar to the straps 210a, 210b shown in FIG. 2. The straps 510a, 510b are independent straps that are operative to move independently with respect to each other. The straps 510a, 510b and secondary straps 520a, 520b are secured to the airframe 502 directly or indirectly, extend over the edge of the windshield 504, and are secured to the windshield 504. The straps 510a, 510b or secondary straps 520a, 520b may be secured to the airframe mounting surfaces with mounting hardware.

Secondary straps 520a, 520b may provide additional support to the windshield 504 during a strike. Like straps 510a, 510b, the secondary straps 520a, 520b are able to flex during windshield deformation. The secondary straps 520a, 520b can be co-located with straps 510a, 510b and positioned over, under, or adjacent to the other straps 510a, 510b. The straps 510a, 510b may mirror a corresponding secondary strap having the same shape and size extending over the edge of the windshield 504. For example, the secondary straps 520a, 520b can be located every 2-3 inches and the straps 510a, 510b can be located every 4-6 inches. In some examples, the straps 510a, 510b are not co-located with the secondary straps 520a, 520b. The straps 510a, 510b and secondary straps 520a, 520b can also be the same or a different material. For example, the straps 510a, 510b can be metal (e.g. aluminum) and the secondary straps 520a, 520b can be composite (e.g. fiberglass acrylic). In some implementations, the straps, the secondary straps, the edging, and the corner supports are used in combination. In other implementations corner supports and/or the edging are not included.

Figure 6A:
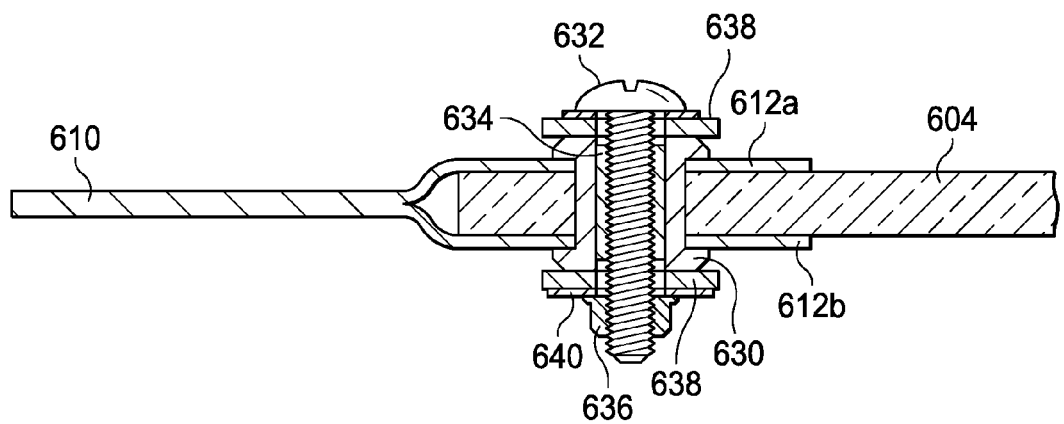
FIGS. 6A-B are example cross-sections of a windshield assembly
Figure 6B:
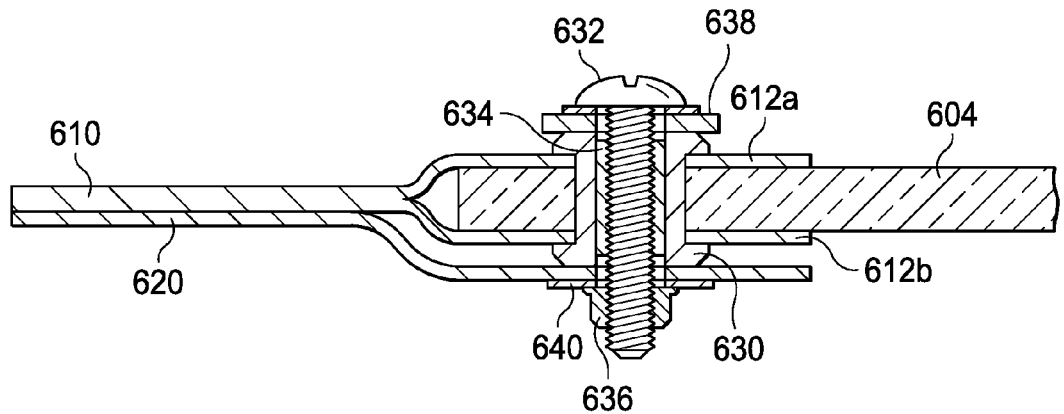

FIG. 6A and FIG. 6B show cross-sections of an example strap connector and secondary strap connector, respectively. The strap connector and secondary strap connector are substantially similar to those shown in FIG. 5, and as such the cross-sections are indicated on FIG. 5. FIG. 6A and FIG. 6B includes secondary strap 610, outboard strap portion 612a, inboard strap portion 612b, windshield 604, fastener 632, grommet 630, spacer 634, washers 638, nut 636, and washer 640. Each secondary strap 610 and independent strap 620 is coupled to the windshield 604 by a connector including the grommet 630 extending through a hole in the windshield 604. The fastener 632 extends through holes in the outboard strap portion 612a, the inboard strap portion 612b, and the grommet 630 and is secured with nut 636. Each secondary strap 610 can have an outboard strap portion 612a and an inboard strap portion 612b on either side of the windshield 604. In some cases, the straps 612a, 612b divide from the same strap 610. In some cases, strap 612a and strap 612b are two separate straps. The washer 638 may comprise nylon or other suitable material. The grommet 630 may comprise silicone or other suitable material.

FIG. 6B is substantially similar to FIG. 6A, except an example independent strap 620 is also included. As described previously, the independent strap 620 provides additional support for the windshield 604 during a strike. The example independent strap 620 is secured to the windshield 604 by the same fastener 632 and nut 636 as the straps 612a, 612b, but with the bottom washer 638 omitted. The independent strap 620 is secured outside of the grommet 630. In some implementations, the fastener 632 is fixed with respect to the independent strap 620 but is able to translate inside the grommet 630. In some cases, the spacer 634 is made of a softer material (e.g. nylon) and will allow the fastener 632 to move inside the grommet 630 during a strike. Each independent strap 620 is coupled to the windshield 604 by a connector including a grommet 630 extending through the windshield 604 and a fastener 632 extending through the grommet 630, the connector operative to allow movement of the windshield 604 relative to the independent strap 620 and the secondary straps 612a, 612b.

In some implementations, one or more of secondary strap portions (or separate secondary straps) 612a, 612b, or independent strap 620 or a portion thereof extends farther over the windshield than another strap. The secondary strap 610 can also have different sizes, shapes, thicknesses, or compositions. The secondary strap 610 and independent strap 620 can be a material such as a composite, metal, or other material. The secondary strap 610 and independent strap 620 can be made of a flexible material, for example a material with a modulus of elasticity from 8-12 MSI. In some implementations, each strap or secondary strap is composed of two or more materials, such as a metal and a composite. The secondary strap 610 and independent strap 620 can be a material such as aluminum, and have a thickness such as 0.032 inches thick. In some implementations, the straps and secondary straps include multiple layers of the same or different materials. The multiple layers can be attached to each other by a technique such as fasteners, an adhesive, or other techniques. The secondary strap 610 and independent strap 620 can also be of different materials. For example, the secondary strap 610 can be a composite and the independent strap 620 can be metal. In some implementations, the straps portions 612a, 612b are secured to the windshield 604 with an adhesive such as urethane.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, it will be understood that various modifications can be made. Accordingly, other implementations are within the scope of the following claims.

What is claimed:

1. A rotorcraft, comprising:
   an airframe;
   a windshield;
   a plurality of independent straps connected to the airframe and the windshield and extending between the airframe and the windshield configured to hold the windshield, each strap is separated from the other straps and operative to move independently with respect to the other straps and to flex with respect to the windshield and the airframe; and
   wherein each strap is coupled to the windshield by a connector, the connector operative to allow movement of the windshield relative to the strap.

2. The rotorcraft of claim 1, wherein independent movement of the straps allow relative movement of portions of the windshield in response to a strike.

3. The rotorcraft of claim 1, wherein the straps are spaced every 4-6 inches along an edge of the windshield.

4. The rotorcraft of claim 1, wherein the straps extend over an edge of the windshield.

5. The rotorcraft of claim 1, wherein:
   the straps comprise at least one of metal and composite material; and
   the windshield comprises polycarbonate.

6. The rotorcraft of claim 1, wherein the straps comprise a modulus of elasticity of 8-12 millions of pounds per square inch (MSI).

7. The rotorcraft of claim 1, further comprising an airframe corner support mounted to the airframe at an outside corner of the windshield, the airframe corner support operative to independently support an upper portion of the windshield with respect to the connectors in response to a strike.

8. The rotorcraft of claim 7, wherein the airframe corner support comprises multiple layers of material.

9. The rotorcraft of claim 7, wherein the airframe corner support has a modulus of elasticity of 8-12 millions of pounds per square inch (MSI).

10. The rotorcraft of claim 7, wherein the airframe corner support is secured to the airframe independent of the windshield.

11. The rotorcraft of claim 7, wherein the airframe corner support is under the windshield.

12. The rotorcraft of claim 1, further comprising windshield edging securing the windshield to the airframe.

13. The rotorcraft of claim 12, wherein the windshield edging comprises strapped edging comprising a plurality of secondary straps connected to the windshield.

14. The rotorcraft of claim 13, wherein each secondary strap of the plurality of secondary straps is coupled to the windshield by the connector, and each connector comprises:
   an outboard strap portion configured to attach to an outboard surface of the windshield, the outboard strap portion comprising a first hole;
   an inboard strap portion configured to attach to an inboard surface of the windshield, the inboard strap portion comprising a second hole; and
   a fastener and a grommet, each configured to pass through the first hole, the second hole and a hole in the windshield and to attach the outboard strap portion and the inboard strap portion to the windshield.

15. The rotorcraft of claim 12, wherein the windshield edging comprises at least one of metal and a composite material.

16. A windshield assembly for a rotorcraft, comprising:
   a windshield;
   strapped edging mounted around a periphery of the windshield, the strapped edging comprising a plurality of secondary straps connected to the windshield, each secondary strap comprising an outboard strap portion configured to attach to an outboard surface of the windshield and an inboard strap portion configured to attach to an inboard surface of the windshield;
   a plurality of independent straps mounted around the periphery of the windshield, the independent straps operative to move independently with respect to each other and to flex with respect to the windshield and the airframe; and
   each independent strap mirroring a corresponding secondary strap of the strapped edging, each independent strap and corresponding secondary strap connected to the windshield by a connector, the independent strap and the corresponding secondary strap to allow movement of the windshield relative to the independent strap and secondary strap.

17. The windshield assembly of claim 16, the strapped edging comprising at least one of metal and composite material with the secondary straps spaced every 2-3 inches around a majority of the periphery of the windshield.

18. The windshield assembly of claim 16, the independent straps comprising at least one of metal and composite material and spaced every 4-6 inches around a majority of the periphery of the windshield.

19. The windshield assembly of claim 16, the connector comprising a grommet and a fastener, each configured to pass through a first hole in the outboard strap portion, a second hole in the inboard strap portion and a third hole in the windshield, and to attach the outboard strap portion and the inboard strap portion to the windshield.

* * * * *